Dec. 7, 1943.   D. G. ROOS   2,335,966
SHIFTABLE STEERING WHEEL
Filed April 28, 1943
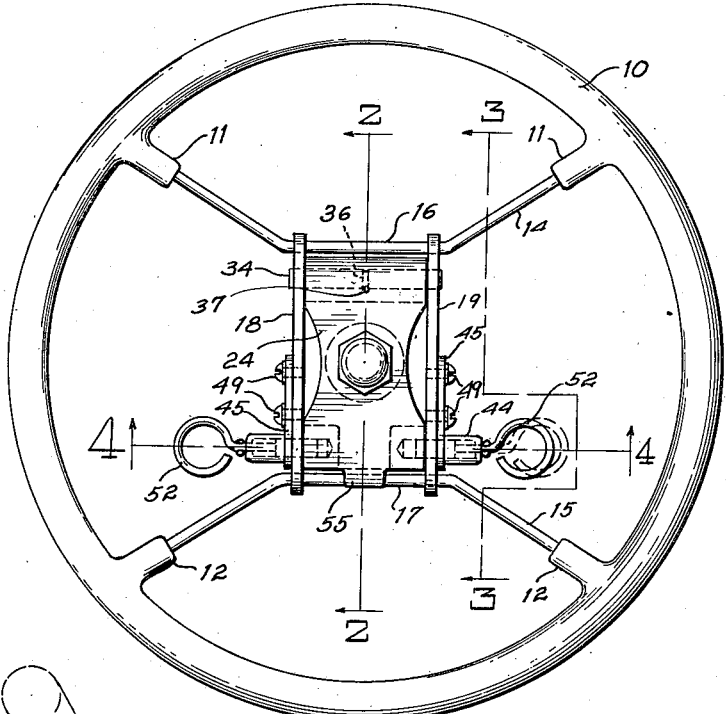
FIG-1-
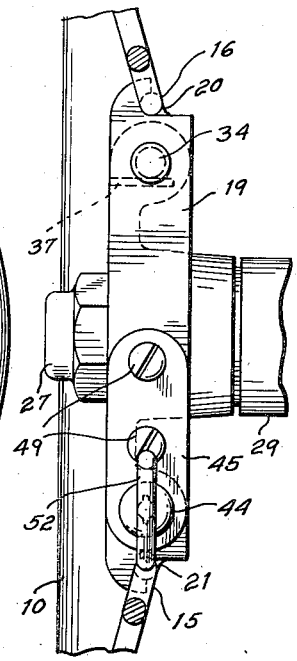
FIG-3-
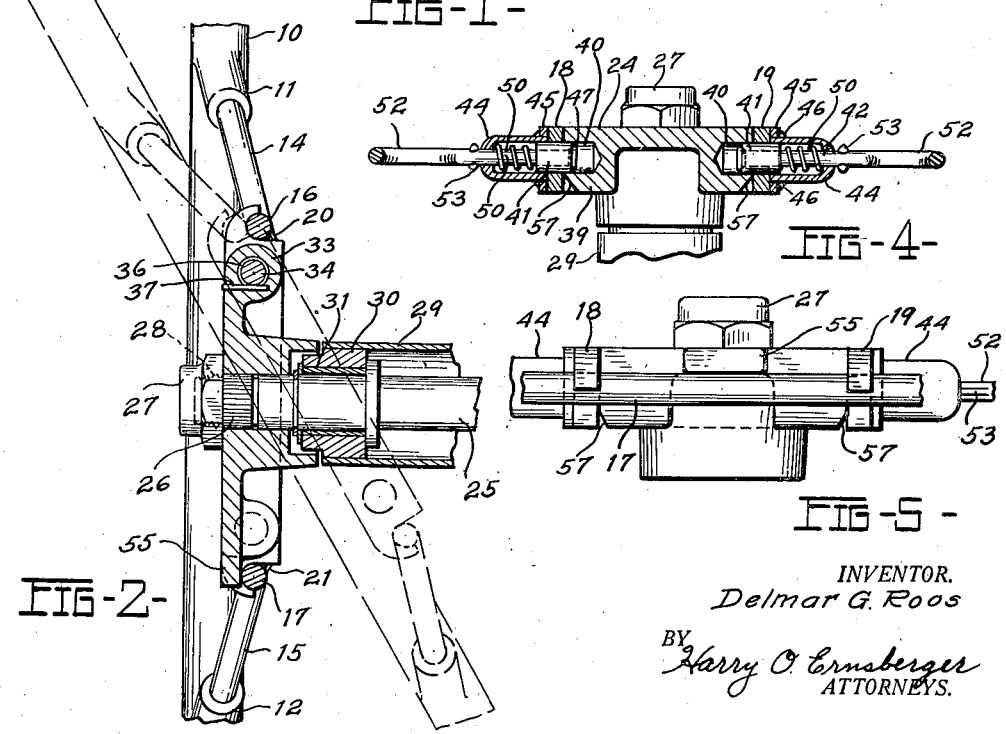
FIG-2-
FIG-4-
FIG-5-
INVENTOR.
Delmar G. Roos
BY
Harry O. Ernsberger
ATTORNEYS.

Patented Dec. 7, 1943

2,335,966

UNITED STATES PATENT OFFICE 2,335,966

SHIFTABLE STEERING WHEEL

Delmar G. Roos, Toledo, Ohio, assignor to Willys-Overland Motors, Inc., Toledo, Ohio, a corporation of Delaware Application April 28, 1943, Serial No. 484,936

7 Claims. (Cl. 74—555)

This invention relates to shiftable steering wheels and more especially to steering wheels of this character which are adapted to be dropped or pivotally moved to a lowered position.

The invention embraces a shiftable steering wheel for vehicles which is arranged to be quickly locked in operative steering position and which may be readily unlocked and shifted to a lowered position to provide added clearance for the driver or vehicle operator in entering or leaving the operator's compartment.

An object of the invention is the provision of a shiftable steering wheel of a character which may be instantly latched or locked in operative position but which may not be inadvertently dislodged from this position without aid of both of the vehicle operator's hands, thus providing a safety means effective to prevent shifting of the wheel during normal vehicle steering operations.

Another object of the invention resides in a simple construction of steering wheel spider which is inexpensive to manufacture yet one which is especially strong and rigid.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

Figure 1 is a top plan view showing a form of steering wheel arrangement of my invention;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 1;

Figure 5 is an end view of a portion of the construction illustrated in Figure 1 particularly showing the stop means for determining the operative position of the steering wheel.

Referring to the drawing in detail, I have illustrated my invention as embodied in a steering wheel construction particularly adapted for controlling directional movement of an automotive vehicle and which is inclusive of a rim 10 preferably fabricated of a moldable composition. Projecting inwardly of the rim 10 are projections 11 and 12 which form anchors for the extremities of spokes or rods 14 and 15 which form part of the steering wheel spider. The central portions 16 and 17 of the spokes 14 and 15 are arranged in substantially parallel relationship as shown in Figure 1 and are joined together by means of spaced parallel bars 18 and 19. The extremities of the bars are recessed as particularly illustrated in Figure 2 to receive the mid portions 16 and 17 of the spokes 14 and 15, the bars being preferably welded or otherwise secured to the spokes as at 20 and 21. By means of the bars 18 and 19 being welded to the mid portions 16 and 17 of the spokes there is provided a rectangular central frame or spider construction which is very rigid and will not become distorted during steering operations.

Arranged within the confines of the frame formed by the spoke portions 16 and 17 and the parallel bars 18 and 19 is a substantially rectangular head 24 which is secured to the upper end of a steering shaft 25 by means of a knurled portion 26 and a securing nut 27, the latter being threaded upon a tenon 28 formed at the upper end of the shaft 25. The steering shaft 25 is enclosed in a conventional sleeve or post 29 which is provided with a positioning sleeve or spacer 30 and a bearing bushing 21 which maintains the steering shaft 25 in a central axial position within the sleeve 29.

The head 24 is formed with a transversely extending boss portion 33 which is bored to receive a shaft 34, the extremities of which pass through aligned openings in the bars 18 and 19 and form journals about which the steering wheel may pivot so as to move the same to an out-of-use position. The shaft 34 is formed with a peripheral groove 36 which is in registration with an opening in the head 24, the latter adapted to receive a drift pin or securing means 37 which projects into the groove as particularly shown in Figure 2 to retain the shaft 34 in position in the head 24.

The portion of the head 24 nearest the vehicle operator is formed with boss portions 39 which are formed with aligned bores 40 arranged to receive or accommodate the plungers or latch members 41. Each latch member 41 is carried upon the inner extremity of a rod 42 having its end swaged to retain the plunger 41 on the rod. The plungers are partially contained within thimble-like housings 44 which project into openings in plates 45 and are welded therein as at 46 or otherwise fixedly secured thereto. Each of the bars 18 and 19 has secured thereto a plate 45, the plates being held in place by means of screws 49. Surrounding the rods 42 and contained within the housings or members 44 are resilient means in the form of expansive coil springs 50 which serve at all times to urge the plungers or latch members 41 toward latching position, i. e. the position illustrated in Figure 4. The rods 42 terminate exteriorly of the housings 44 in annular configurations or eyes 52 forming manipulating means for withdrawing the latching members 41 from engagement with the head 24. Each of the rods 42 adjacent the bases of the eyes 52 are formed with integral struck-up projections 53 which serve as stop means to limit the innermost positions of the latching members as well as to prevent disassembly of the latch members 41 and springs 50 in the housings 44, these projections being formed on the rods after the parts are in assembled relationship.

As particularly illustrated in Figures 1 and 5 the head 24 is provided with a projection or abutment 55 which extends into the path of movement of portion 17 of the spoke 15 forming a stop means so as to define the initial or operative steering position of the steering wheel as shown in Figure 5. When the portion 17 of spoke 15 contacts or engages the lower surfaces of the abutment 55, the latch members or plungers 41 are in alignment with the bores 40 as illustrated in Figure 4 and in this position the plungers automatically move into locking position under the influence of springs 50.

The exterior lower surfaces of the bosses 39 are provided with chamfers or angularly disposed surfaces 57 which cooperate with the beveled or chamfered extremities 47 formed on the latch members 41 to facilitate the automatic retraction of the latch members when the steering wheel is being moved from its out-of-use position to its operative or steering position as the surfaces 57 provide inclined planes serving to move the latch members laterally as the steering wheel spider approaches its operative position.

Assuming that the steering wheel is in operative or steering position as illustrated in full lines in Figures 1 and 2 with the latch members 41 projecting into the bores 40 and the head 24 with the spoke 17 in engagement with abutment 55, when the vehicle operator desires to shift the steering wheel to a position, for example, as illustrated in dotted lines in Figure 2, the operator first inserts his thumbs into the loops or eyes 52 formed on the rods 42. By exerting outward pressure upon the rods 42 the plungers 41 are withdrawn from the bores 40 in which position the central frame structure or spider of the steering wheel may be pivotally moved downwardly about the axis of shaft 34. When it is desired to move the steering wheel to its normal position of use, it is only necessary for the operator to grasp the lower portion of the wheel rim 10 and exerting an upward force, pivoting the spider about the axis of the shaft 34 bringing the beveled extremities 47 of the plungers 41 into engagement with the chamfers or inclined surfaces 57. These cooperating surfaces serve to retract the plungers 41 laterally, compressing the springs 50, and permitting the bars 18 and 19 to move into parallel alignment with the head 24 until the abutment or stop means 55 contacts the central portion 17 of the spoke 15. When the steering wheel assembly has been moved to this position, the plungers 41 are moved into latch or locked position in the bores 40 in head 24 under the influence of the expansive springs 50. Through this arrangement I have provided the very durable and rigid construction of shiftable steering wheel which may be quickly and inexpensively manufactured and assembled, and which is not liable to get out of order.

It is apparent that, within the scope of the invention, modifications and different arrangements may be made other than is herein disclosed, and the present disclosure is illustrative merely, the invention comprehending all variations thereof.

What I claim is:

1. In combination, a shaft, a substantially rectangular head fixed upon one end of said shaft, a spider including a pair of rods having spaced parallel central portions, a pair of spaced substantially parallel bars welded to the central portions of said rods, said bars and said head having aligned openings, a shaft extending through said openings and forming a pivotal axis for said spider, a bore in said head, a plunger arranged for slidable movement in said bore, a housing for said plunger secured to one of said bars; manipulating means for said plunger including a rod terminating in a loop forming a manipulating portion; resilient means for normally urging said plunger toward one position, and means engageable with one of the rods forming a part of the spider for determining the operative position of said spider with respect to said head.

2. In combination, a shaft, a head fixed upon one end of said shaft, a spider including a pair of rods having spaced parallel central portions, a pair of spaced substantially parallel bars secured to the central portions of said rods, said bars and said head having aligned openings, a shaft extending through said openings and forming a pivotal axis for said spider, a bore in said head, a plunger arranged for slidable movement in said bore, a housing for said plunger secured to one of said bars; manipulating means for said plunger including a rod terminating exteriorly of said housing in a loop configuration, and a struck up projection formed on said manipulating rod for limiting the inward movement of said plunger.

3. In combination, a shaft, a head fixed on the end thereof, a spider inclusive of a bar arranged at either side of said head, a shaft extending transversely through said head, said bars being journaled for pivotal movement upon said shaft; a pair of spokes forming part of said spider and having their central portions secured to said bars, said head having a pair of bores therein; a plate secured to each of said bars, a housing secured to each plate, a latch plunger in each of said housings, manipulating means secured to each plunger and extending exteriorly of said housing, and means in each of said housings for normally urging said latch plungers in the bores in said head.

4. In combination a shaft, a head fixed on the end thereof, a spider inclusive of spaced parallel bars arranged at either side of said head, a shaft extending transversely through said head, said bars being journaled for pivotal movement upon said shaft, a pair of spoke rods forming part of said spider and having their central portions welded to said bars, said head having a pair of bores therein, plate secured to each of said bars, a housing welded to each plate, a plunger slidably mounted in each of said housings, a rod secured to each plunger and extending exteriorly of said housing, portions of the rods extending exteriorly of the housings being formed to annular configuration forming manipulating means, means in each of said housings for normally urging said plungers into the bores in said head, and means associated with said manipulating rods for limiting the position of said plungers in said bores.

5. In combination a shaft, a head fixed on the end thereof, a spider inclusive of spaced bars arranged at either side of said head, a shaft carried by said head, said bars being journaled for pivotal movement upon said shaft, a pair of spokes forming part of said spider and having their central portions secured to said bars, said head being formed with a pair of aligned bores, a plate secured to each of said bars, a housing secured to each plate, a plunger slidably mounted in each of said housings, a manipulating rod secured to each plunger and extending exteriorly of said housing, resilient means in each of said housings for normally urging said plungers into the bores in said head, and means associated with said manipulating rods for limiting the inward movement of said plungers; and stop means formed on said head and engageable with one of said spokes for determining the operative position of said spider with respect to said head.

6. In combination a shaft, a head fixed on the end thereof, a spider inclusive of spaced parallel bars arranged at either side of said head, a shaft extending transversely through said head, said bars being journaled for pivotal movement upon said shaft, a pair of spokes forming part of said spider and having their central portions welded to said bars, said head having a pair of aligned bores, a plate secured to each of said bars, a housing secured to each plate, a plunger in each of said housings, a rod secured to each plunger and extending exteriorly of said housing, the portions each of the rods extending exteriorly of the housings being formed to annular configuration forming manipulating means for the plungers, resilient means in each of said housings for normally urging said plungers into the bores in said head, and means including integrally struck up projections formed on said manipulating rods for limiting the inward movement of said plungers, and stop means formed on said head and engageable with one of said spokes for determining the operative position of said spider with respect to said head.

7. In combination a shaft, a head fixed on the end thereof, a spider inclusive of spaced parallel bars arranged at either side of said head, a shaft extending transversely through said head, means for securing said shaft in said head, said bars being journaled for pivotal movement upon said shaft, a pair of spokes forming part of said spider and having central parallel portions welded to said bars, said head having a pair of aligned bores, a plate secured to each of said bars, a housing welded to each plate, a latch member slidably mounted in each of said housings, a rod associated with each latch member and extending exteriorly of housing, the portion of each of the rods extending exteriorly of the housings being formed to annular configuration forming manipulating means for said latch members; resilient means in each of said housings for normally urging said latch members into the bores in said head, and means including integrally struck up projections formed on said rods for limiting the inward movement of said plungers, and stop means formed on said head and engageable with one of said spokes for determining the operative position of said spider with respect to said head.

DELMAR G. ROOS.